US012798431B2

(12) United States Patent
Probst et al.

(10) Patent No.: US 12,798,431 B2
(45) Date of Patent: Nov. 17, 2026

(54) METHOD FOR CONTROLLING A POWER CONSUMPTION OF A RAIL VEHICLE FLEET

(71) Applicant: Siemens Mobility GmbH, Munich (DE)

(72) Inventors: Sebastian Probst, Nuremberg (DE); Hagen Scheibe, Ottobrunn (DE); Wilhelm Burg, Bamberg (DE)

(73) Assignee: Siemens Mobility GmbH, Munich (DE)

(*) Notice: Subject to any disclaimer, the term of this patent is extended or adjusted under 35 U.S.C. 154(b) by 544 days.

(21) Appl. No.: 18/345,112

(22) Filed: Jun. 30, 2023

(65) Prior Publication Data

US 2024/0001796 A1 Jan. 4, 2024

(30) Foreign Application Priority Data

Jun. 30, 2022 (DE) .................... 10 2022 206 678.2

(51) Int. Cl.
*B60L 53/68* (2019.01)
*B60L 50/53* (2019.01)
(Continued)

(52) U.S. Cl.
CPC ............... *B60L 53/68* (2019.02); *B60L 50/53* (2019.02); *B60L 53/64* (2019.02); *B60L 53/66* (2019.02);
(Continued)

(58) Field of Classification Search
CPC ...... B60L 53/68; B60L 53/66; B60L 2200/26; B60L 2260/50; B60L 53/67; B60L 50/53;
(Continued)

(56) References Cited

U.S. PATENT DOCUMENTS

2008/0270023 A1 10/2008 Kumar
2012/0316717 A1* 12/2012 Daum .................... B60L 55/00 701/22

(Continued)

FOREIGN PATENT DOCUMENTS

DE 102019212991 A1 3/2021
DE 102019217148 A1 5/2021

*Primary Examiner* — Peter D Nolan
(74) *Attorney, Agent, or Firm* — Laurence A. Greenberg

(57) ABSTRACT

A method controls the electrical power consumption of a rail vehicle fleet. The vehicle fleet contains a plurality of rail vehicles each having an electrical energy storage system for supplying a drive system. The energy storage systems are charged by an electrical supply network and/or electric charging stations along a rail network. Static and time-varying information of rail vehicles which are currently in a driving mode and static information relating to a timetable, schedule and/or vehicle deployment plan of the currently operated rail vehicles are combined. By the combined information and taking into account the power consumption of the rail vehicle fleet from a charging planning facility, a vehicle-specific charging plan for charging the energy storage systems of the rail vehicles currently in the driving mode is determined. The charging of the energy storage systems of the rail vehicles is carried out in dependence on the vehicle-specific charging plan.

15 Claims, 1 Drawing Sheet

(51) Int. Cl.

| | |
|---|---|
| ***B60L 53/64*** | (2019.01) |
| ***B60L 53/66*** | (2019.01) |
| ***B61C 3/00*** | (2006.01) |
| ***B61L 27/14*** | (2022.01) |
| ***B61L 27/16*** | (2022.01) |
| ***B61L 27/70*** | (2022.01) |

(52) U.S. Cl.
CPC ................ *B61C 3/00* (2013.01); *B61L 27/16* (2022.01); *B61L 27/70* (2022.01); *B60L 2200/26* (2013.01); *B61L 27/14* (2022.01)

(58) Field of Classification Search
CPC . B60L 53/64; B60L 53/65; B61C 3/00; B61L 27/16; B61L 27/70; B61L 27/14
See application file for complete search history.

(56) References Cited

U.S. PATENT DOCUMENTS

| | | | |
|---|---|---|---|
| 2021/0001905 A1 | 1/2021 | Cooper et al. | |
| 2021/0129874 A1* | 5/2021 | Mazzone ............ | B61L 15/0018 |

* cited by examiner

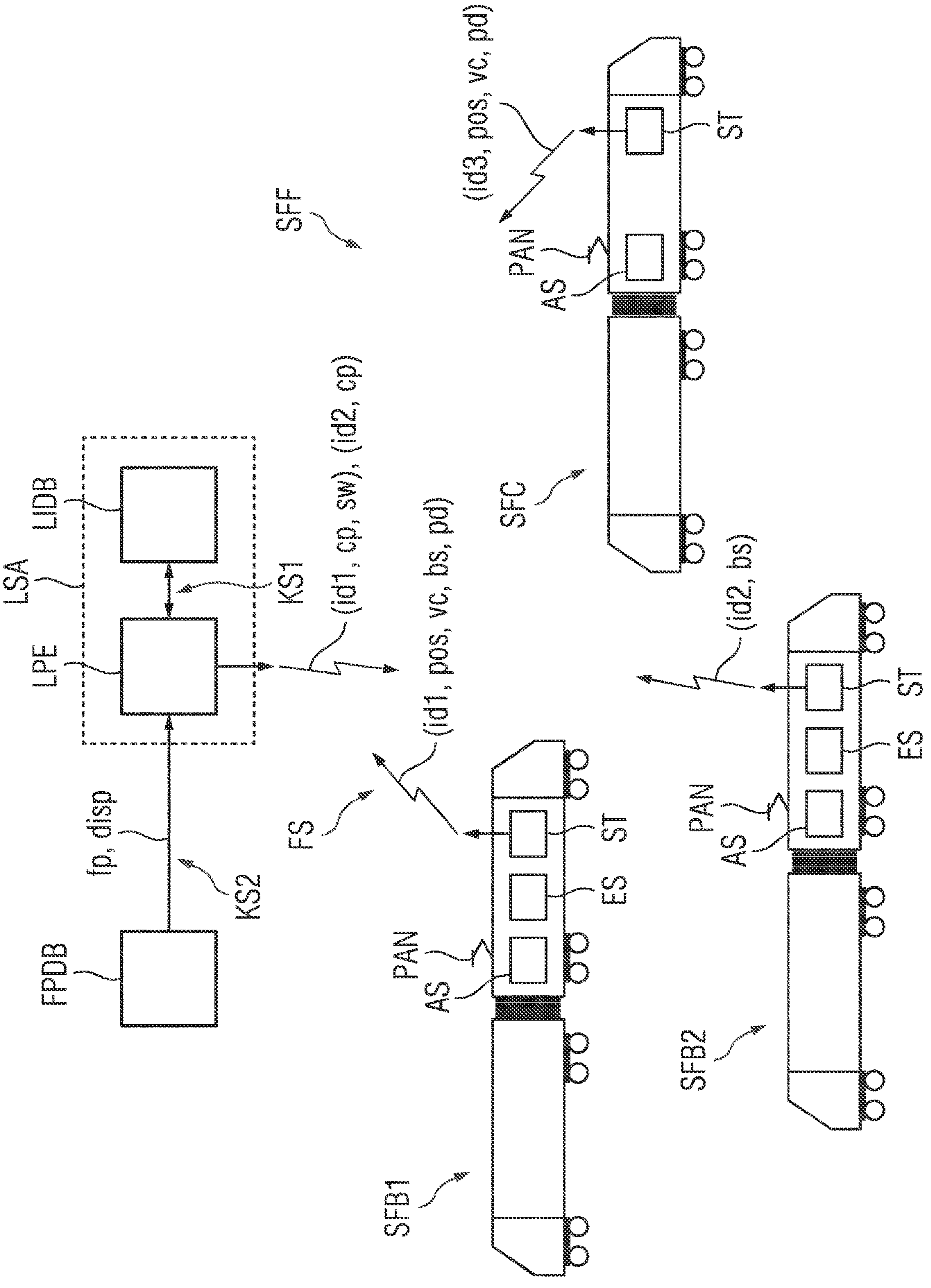
LSA
LPE
LIDB
KS1
FPDB
fp, disp
KS2
(id1, cp, sw), (id2, cp)
(id1, pos, vc, bs, pd)
FS
SFF
(id3, pos, vc, pd)
PAN
AS
ST
SFC
ES
SFB1
SFB2
(id2, bs)

METHOD FOR CONTROLLING A POWER CONSUMPTION OF A RAIL VEHICLE FLEET

CROSS-REFERENCE TO RELATED APPLICATION

This application claims the priority, under 35 U.S.C. § 119, of German Patent Application DE 10 2022 206 678.2, filed Jun. 30, 2022; the prior application is herewith incorporated by reference in its entirety.

FIELD AND BACKGROUND OF THE INVENTION

The operator of a rail vehicle fleet often uses the rail network of a network operator and pays the latter a certain usage fee depending on the use of the rail network. In addition to the rail network, the network operator generally also provides electrical energy which the rail vehicles of the fleet receive via overhead lines or separate busbars of a supply network routed along the rail network and use for their operation. The fleet operator also pays the network operator a consumption-dependent fee for the energy received. In addition to an energy charge with a certain amount per absorbed amount of energy, for example, per kWh (kilowatt hour), the price model of the network operator often comprises a service price with a certain amount per energy absorbed, for example, kW (kilowatts) per time unit (month or year). The amount of the service price increases, for example, in proportion to the highest absorbed energy, the energy absorbed being averaged over a specific period of time, for example fifteen minutes.

The usage fee for the rail network and the energy fee constitute essential cost factors for the fleet operator for the operation of the rail vehicle fleet. In particular, the fleet operator seeks to reduce energy fees, for example, by using more energy-efficient rail vehicles and/or by means of more energy-efficient operation of the rail vehicles using driver assistance systems.

Another possibility for reducing the energy fees consists, in principle, of more uniform energy absorption by the fleet and thus a lower service price, which can be achieved by reducing or even avoiding periods of high energy consumption. In particular, it should be noted that a return feed of electrical energy into the supply network by the rail vehicles during a period of high energy consumption is usually not taken into account in the calculation of the service price, initially rendering compensation by a parallel return feed unsuitable as a possible approach for more uniform energy consumption by the fleet.

More uniform energy consumption is also made more difficult with the introduction of rail vehicles with electrical energy storage systems for power transmission. Electrical energy storage systems on the rail vehicle, also referred to as drive or traction batteries, advantageously enable operation on non-electrified or only partially electrified routes, i.e. routes without overhead lines or separate busbars, or where these are only present on sections. Rail vehicles equipped with such energy storage systems are suitable as a replacement for previously used rail vehicles with internal combustion engines for their energy supply.

Due to the limited amount of energy which can be stored in the electrical energy storage systems, these must be recharged with electrical energy at specific time intervals or distances during the operation of the rail vehicle. The charging of the energy storage system takes place, for example, during a journey of the rail vehicle on an electrified route section or at specific charging stations, the latter preferably being arranged in the region of holding stations. A charging process, whether while traveling on an electrified route section, during a stop on such a route section or during a stop at a special charging station on a non-electrified route section, takes place with the aim of absorbing an amount of energy which is sufficient for the subsequent journey to the next electrified route section or to the next charging station during the limited period of time of a connection to the supply network. In particular, if a plurality of rail vehicles of the fleet carry out a charging process with a respectively high-power consumption at the same time or at only slightly staggered intervals, this results in higher service prices and thus counteracts the aim of the fleet operator in reducing service prices in particular.

Published, non-prosecuted German patent application DE 10 2019 217 148 A1, corresponding to U.S. patent publication No. 2021/0129874, discloses a method for operating a rail vehicle fleet containing a plurality of rail vehicles, wherein each rail vehicle is configured to receive electrical energy from a vehicle-external power supply for locomotion. An energy demand variable of each rail vehicle is transmitted to a fleet control facility and an upper uptake limit is determined depending on the energy demand variables obtained in order to avoid power peaks for at least one of the rail vehicles.

SUMMARY OF THE INVENTION

The object of the invention is therefore to specify a method and a system by means of which periods of high-power consumption can be reduced or avoided during the operation of a rail vehicle fleet.

This object is achieved by the respective features of the independent claims. Developments are specified in respective dependent claims.

A first aspect of the invention relates to a method for controlling electrical power consumption of a rail vehicle fleet. The rail vehicle fleet contains a plurality of rail vehicles, each having at least one electrical energy storage system for supplying a drive system of the rail vehicle with electrical energy, and wherein the energy storage systems are charged by means of an electrical supply network and/or electric charging stations along a rail network which is traversed by the rail vehicle fleet. The method is characterized in that in a central database at least static and time-varying information of rail vehicles of the plurality of rail vehicles currently in driving mode, and static information relating to a respective timetable and/or schedule and/or vehicle operation plan of the currently operated rail vehicles, are combined, a vehicle-specific charging plan for charging the energy storage systems of the rail vehicles currently in driving mode is determined by means of the combined information and, taking into account the power consumption of the rail vehicle fleet from a charging planning facility, and the charging of the energy storage systems of the rail vehicles currently in driving mode is carried out as a function of the vehicle-specific charging plan.

The invention is based on the finding that a reduction or limitation of the service price to be paid to a network operator is advantageously made possible if the charging of the rail vehicles each equipped with at least one electrical energy storage system is planned on a fleet level hierarchically superior to these rail vehicles, on which the power consumption of the fleet can be taken into account as a criterion.

As a result, the electrical energy storage systems of the rail vehicles to be charged can not only bring about a temporary increase in the power consumption of the fleet described above, which can disadvantageously lead to a higher service price, but on the contrary harmonize or stabilize the power consumption of the fleet in order to advantageously realize cost reductions due to lower service prices. In this case, the charging planning can be optimized in particular with regard to a billing model, in particular specifically to a billing model for the service price of the network operator.

A vehicle-specific charging plan according to the invention comprises, for example, a time for the start of the next charging process and a duration of the charging process dependent on the amount of energy to be charged and/or the power consumption during the charging process. The charging plan preferably contains a plurality of future times for a respective start of a charging process which are in accordance with the timetable or schedule of the respective rail vehicle. However, even during a charging process of a rail vehicle which has already been started by means of the charging plan for example, the power consumption can be temporarily reduced if high power consumption by the fleet is detected. The charging plan can thus be used for both long-term and short-term planning of the charging of energy storage systems of rail vehicles.

The schedule defines, for example, an assignment of rail vehicles to journeys as well as the routes on which they are to travel, in particular all the journeys of a respective rail vehicle for its scheduled operation. The schedule thus serves as a basis for deployment planning and travel planning of the respective rail vehicle or rail vehicle fleet. Schedules may comprise one or more operating days.

The central database, in which the various pieces of information are combined, is preferably assigned to the operator of the rail vehicle fleet. This makes it possible, in particular, to combine all the information relevant for determining the charging plans of the rail vehicles in the central database in order to be able to take this information into account accordingly in accordance with the invention.

According to a first development of the method, additionally static and time-varying information of further rail vehicles of the plurality of rail vehicles moving into driving mode in the future and static information relating to the respective timetable and/or schedule and/or vehicle deployment plan of the further rail vehicles is combined in the central database. The static and time-varying information of the further rail vehicles is additionally taken into account by the charging planning facility for the determination of the vehicle-specific charging plan for charging the energy storage systems of the rail vehicles currently in driving mode. A vehicle-specific charging plan for charging the energy storage systems of the further rail vehicles is additionally determined by means of the combined information from the charging planning facility, taking into account the power consumption of the rail vehicle fleet, and the charging of the energy storage systems of the further rail vehicles is carried out as a function of the vehicle-specific charging plan.

In addition to the information of the rail vehicles of the plurality of rail vehicles currently in driving mode, according to this development information from further rail vehicles of the plurality of rail vehicles having at least one electrical energy storage system in preparation for a driving operation is thus also combined in the central database. These rail vehicles are located in particular on standby, locally for example, in depots or sidings of the rail network in which they are connected to the supply network or a charging station. The more comprehensive information is taken into account for the determination of the respective charging plan both of the rail vehicles already in driving mode and of the further rail vehicles, wherein the charging plans for the further rail vehicles in particular define a respective time of a charging process in preparation for subsequent driving mode. Advantageously, this enables charging planning which takes into account the power consumption of a larger number of rail vehicles of the fleet.

According to a further development of the method, static and time-varying information of other rail vehicles of the rail vehicle fleet which are in driving mode and without electrical energy storage systems are additionally stored in the central database, wherein the drive system of the respective other rail vehicle is supplied with electrical energy by means of the supply network, and static information relating to the respective timetable and/or schedule and/or vehicle deployment plan of the other rail vehicles is combined, and the static and time-varying information of the other rail vehicles is additionally taken into account by the charging planning facility for the determination of the vehicle-specific charging plan for charging the energy storage systems of the rail vehicles currently in driving mode, and in particular of the further rail vehicles moving into driving mode in the future.

In addition to the information of the rail vehicles currently in driving mode and, in particular, of the further rail vehicles moving into driving mode in the future, information from other rail vehicles in driving mode is thus also brought together in the central database and taken into account for the determination of the charging plans for the rail vehicles and, in particular, the further rail vehicles. The other rail vehicles of the fleet have no electrical energy storage systems but can and are operated exclusively on electrified route sections of the rail network. The power consumption of these other rail vehicles of the fleet, which is subject to fluctuations during driving mode and which can be estimated to a certain extent in particular on the basis of the timetables and knowledge of the routes traversed by these, advantageously makes it possible to achieve greater certainty in the estimation of the power consumption of the fleet in order to determine the charging plans accordingly.

According to a further development of the method, additionally time-varying information relating to the respective timetable and/or schedule and/or vehicle deployment plan of the rail vehicles is combined in the central database.

Although timetables and schedules of the rail vehicles of a fleet can be regarded as static over a certain period of time, situations requiring deviations from a predefined plan can occur. Such a situation is, for example, a fault in a route section of the rail network, it being possible that the rail network itself, rail vehicles or other influences may have caused the fault. Such time-varying information, which temporarily changes the static information of timetables and/or schedules, is advantageously taken into account additionally for the determination of the charging plans.

According to a further development of the method, the vehicle-specific charging plan is additionally determined for discharging the energy storage systems of the rail vehicles currently in driving mode, and the discharging of the energy storage systems of the rail vehicles currently in driving mode is carried out as a function of the vehicle-specific charging plan.

For example, a rail vehicle traveling on an electrified route section can be supplied despite the energy available from the energy storage system on the network side in order to thereby reduce the power consumption of the fleet from the supply network during a specified period of time. The energy consumed during this period of time by discharging the energy storage system can be recharged from the supply network into the energy storage systems during a subsequent period of time with a lower power consumption of the fleet in accordance with the charging plan.

According to a further development of the method, the vehicle-specific charging plan additionally determines a threshold value for the power consumption of the rail vehicles currently in driving mode and in particular of the further rail vehicles moving into driving mode in the future, and the power consumption of the rail vehicles currently in driving mode and in particular of the further rail vehicles moving into driving mode in the future is controlled as a function of the vehicle-specific threshold value.

For example, a rail vehicle traveling on an electrified route section can draw energy from the supply network, but only up to a level of power consumption predetermined by means of the charging plan, which is defined by the threshold value. If the rail vehicle or its drive system requires more electrical energy than the power consumption permitted according to the threshold value of the charging plan for operation, the energy difference is taken from the energy storage system, as a result of which the latter is discharged. If the rail vehicle subsequently requires less than the power consumption permitted according to the threshold value for operation, the energy storage system is recharged by means of the energy difference. Advantageously, this makes it possible to control the power consumption of the fleet, which, especially in the case of supply by means of a supply network, represents only a low load for the energy storage systems of the rail vehicles.

Likewise, for example, the power consumption of a further rail vehicle, the energy storage system of which is charged in preparation for subsequent driving mode, can be limited, in particular temporarily, by means of the threshold value.

According to a further development of the method, the information of the rail vehicle currently in driving mode, and in particular of the further rail vehicles moving into driving mode in the future contains, as static information, one or more of the pieces of information of an identification, a vehicle type, and as time-varying information, one or more of the pieces of information of a current position, a current speed, current and/or expected power consumption, current and/or historical energy consumption values, a current state of charge of the at least one energy storage system.

The rail vehicle identification, for example, an individual vehicle number, serves in particular to uniquely assign the rail vehicle to the static information of the timetable and/or schedule, so that an individual charging plan can be determined for each of the plurality of rail vehicles. The vehicle type, for example an indication of the series, can provide information about the drive system as well as the at least one energy storage system of the rail vehicle, which are already stored in the central database, for example. The time-varying information makes it possible to make estimates with regard to current and future energy consumption, from which a requirement for charging the at least one energy storage system of the respective rail vehicle can be derived and controlled accordingly via the charging plan. In particular, information relating to expected power consumption or energy consumption resulting therefrom can originate, for example, from a control system of the rail vehicle and be summarized by this, for example, to provide information relevant to the central database.

According to a further development of the method, the rail vehicles of the rail vehicle fleet and the central database and/or the charging planning facility each have a communication interface. The static and time-varying information of the rail vehicles being transmitted to the central database via the communication interfaces, and the specific vehicle-specific charging plans or respective information relating to the charging plans being transmitted to the rail vehicles.

The communication interfaces are preferably configured as secured and/or prioritized radio interfaces via which the respective relevant information is transmitted in a radio-based manner. In this case, the respective information is transmitted, for example, according to a specific protocol and with a specific periodicity. The respective charging plan can comprise, for example, information exclusively relating to a next charging process or else a plurality of future charging processes of the rail vehicle. The information included in the charging plan can be displayed in a suitable manner to the person driving the vehicle, for example via an optical output unit, so that unless the charging process is controlled in an automated manner, the person driving the vehicle can manually initiate and terminate it at the specific time.

According to a further development of the method, the central database and a central timetable and schedule database each have a communication interface to the charging planning facility, wherein the static and in particular time-varying information relating to a respective timetable and/or schedule and/or vehicle deployment plan of the currently operated rail vehicles and, in particular, of the further rail vehicles moving into driving mode in the future and/or the other rail vehicles of the rail vehicle fleet are transmitted via the communication interfaces.

The central database is thus given direct access to a further central database of the fleet operator, in which the timetables and/or schedules of the fleet are stored. The information managed by means of this database can also include, for example, temporary changes to timetables which, if such changes occur, are communicated to the central database via the communication interfaces. The communication interfaces can be configured as radio interfaces and alternatively as wired interfaces.

A second aspect of the invention relates to an arrangement for controlling the electrical power consumption of a rail vehicle fleet. The arrangement contains at least one central database and one charging planning facility. At least a plurality of rail vehicles of the rail vehicle fleet are connected in terms of communication technology to the central database and/or the charging planning facility. The rail vehicles each have at least one electrical energy storage system for supplying a drive system with electrical energy, which can be charged by means of an electrical supply network and/or electric charging stations along a rail network traversed by the rail vehicle fleet, and the arrangement being configured to carry out the method according to the first aspect of the invention.

A third aspect of the invention relates to a rail vehicle of a rail vehicle fleet. The rail vehicle contains at least one drive system and at least one electrical energy storage system. The at least one energy storage system serves to supply the drive system with electrical energy. A communication interface for transmitting static and time-varying information to an arrangement is assigned to the rail vehicle fleet. The arrangement contains at least one central database and one charging planning facility, and for receiving a charging plan, the charging plan being provided by the charging planning facility by means of information regarding the rail vehicle combined in the central database as well as static and time-varying information regarding further rail vehicles of the rail vehicle fleet currently in driving mode, static information relating to a timetable and/or schedule and/or vehicle deployment plan of the rail vehicle and being determined taking into account the power consumption of the rail vehicle fleet, and a rail vehicle controller for controlling the charging of the at least one energy storage system as a function of the received charging plan.

Other features which are considered as characteristic for the invention are set forth in the appended claims.

Although the invention is illustrated and described herein as embodied in a method for controlling a power consumption of a rail vehicle fleet, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURE

The single FIGURE of the drawing is an illustration of a rail vehicle fleet in communication with an arrangement according to the invention.

DETAILED DESCRIPTION OF THE INVENTION

Referring now to the single FIGURE of the drawings in detail, there is shown a diagrammatic view of a rail vehicle fleet SFF of a fleet operator. The plurality of rail vehicles of which travel on a rail network which is not shown, for example for passenger transport. The fleet SFF contains, by way of example, a first number of rail vehicles, represented by the first rail vehicle SFB1, each having at least one electrical energy storage system ES for supplying a drive system AS of the rail vehicle, which are in an active driving mode at the time considered by way of example, i.e. a respective route section of the rail network used according to a predefined timetable. Furthermore, the fleet SFF contains a second number of rail vehicles, represented by the second rail vehicle SFB2, which are configured in accordance with the first number of rail vehicles SFB1, but which are not in the driving mode at the time under consideration but rather, for example, on standby. Finally, the fleet SFF contains a third number of rail vehicles, represented by the third rail vehicle SFC, which do not have an electrical energy storage system.

The rail network used by the fleet SFF includes electrified routes, for example between larger cities, and partially electrified routes, for example from such cities to more rural regions of the geographical area covered by the rail network. In addition, the rail network can also comprise non-electrified routes which, however, are not considered further. Electrified routes are characterized in that they are supplied with electrical energy over the entire route by means of an electrical supply network in the form of overhead lines running along the tracks of the routes. In Europe, the overhead lines can, for example, carry alternating voltages of 25 kV, 50 Hz or 15 kV, 16.7 Hz or direct voltages of 3 kV or 1.5 kV. The electrical energy is taken up by the rail vehicles via current collectors PAN which are electrically connected to the overhead lines and are used for power transmission and the supply of auxiliary operations of the respective rail vehicle.

Partially electrified routes, on the other hand, are characterized in that it is not the entire route which is electrified, but only certain sections of the route, for example again in the vicinity of cities. Such partially electrified routes can only be used by rail vehicles which can be connected to both an overhead line or to a busbar to receive energy therefrom on electrified sections of the route, and also have a vehicle-specific energy supply in order to be able to travel on non-electrified sections of the route by means of the electrical energy generated. Until now, internal combustion engines which generate electrical energy by means of a generator driven by them have predominantly served as the vehicle's own energy source. In the context of a desired reduction in greenhouse gases, rail vehicles with internal combustion engines are increasingly being replaced by those with electrical energy storage systems. Such energy storage systems are preferably configured as batteries or traction batteries, the stored electrical energy of which serves to supply the drive or traction system as well as the auxiliary operations of the rail vehicles while traveling on non-electrified route sections. The energy storage systems ES are charged while traveling on electrified route sections and, if necessary, at special charging stations, which are preferably arranged in the region of holding stations along the route. With charging while traveling on an electrified route section or a stop at a charging station, an amount of energy is supplied to the energy storage systems which is sufficient for traveling on a subsequent non-electrified route section as far as the next charging station or next electrified route section.

The first and second rail vehicles SFB1, SFB2 of the FIGURE, thus each have one or more electrical energy storage systems ES, in which stored electrical energy is used in particular to supply the drive system AS. The drive system AS contains a number of drive motors and one or more power converters which feed the drive motors, typically so-called pulse inverters (PWR). Depending on the supply voltage of the supply network, a transformer and one or more rectifiers, typically so-called four-quadrant controllers (4QS), are additionally required, where appropriate, for converting the high alternating current on the network side into a lower direct current. On the output side, the rectifier feeds a DC voltage intermediate circuit, from which in turn the power converter or power converters are fed on the input side. Likewise connected to the DC voltage intermediate circuit, the energy storage system or energy storage systems ES are connected, for example directly or via a DC voltage converter, to the DC voltage intermediate circuit of the drive system AS. The energy storage system or energy storage systems ES are thus charged from the DC voltage intermediate circuit of the drive system AS, the electrical energy for this being drawn from the supply network or a charging station via the current collectors PAN, and feed the stored electrical energy into the DC voltage intermediate circuit. A controller ST assigned in particular to the drive system AS controls the functions of the various transducers, actuators and converters and thus also the charging and discharging of the energy storage system or energy storage systems ES of the respective rail vehicle SFB1, SFB2. The controller ST also serves to detect the state of the various components of the drive system AS, in particular a respective state of charge of the one or more energy storage systems ES, and to detect the state of the rail vehicles SFB1, SFB2 during driving mode, in particular a current position and speed.

The controllers ST of the rail vehicles SFB1, SFB2 are connected in terms of communication technology to a central charging planning facility LPE via a radio interface FS. For this purpose, the rail vehicles SFB1, SFB2 each have a transmitting/receiving facility, including an antenna, which is connected to the controller ST and not specifically shown. Likewise, the charging planning facility LPE is connected to a transmitting/receiving facility, likewise not shown, including at least one antenna or a radio network having a plurality of such facilities and antennae. Information is transmitted between the charging planning facility LPE and the rail vehicles SFB1, SFB2 via the radio interface FS.

The charging planning facility LPE can be configured as a separate structural unit, in particular as a computing unit with a number of microprocessors for information processing. Preferably, however, the charging planning facility LPE is configured as one of a plurality of functions or applications of a server or server system, in particular of a cloud server or cloud server system, which serves or serve to administer and control the fleet SFF. In terms of communication technology or via a communication interface KS1, the charging planning facility LPE is furthermore connected to a central database LIDB, in which information relevant for the charging planning of the rail vehicles SFB1, SFB2 of the fleet is temporarily stored. The central database LIDB can in turn be configured as a separate structural unit, but it is preferably configured as part of a central data memory comprising a plurality of databases, in particular a cloud data memory or cloud data storage system. Together, the charging planning facility LPE and a database LIDB form an arrangement LSA by means of which the power consumption of the SFF fleet is controlled.

In addition, the charging planning facility LPE or the arrangement LSA is connected in terms of communication technology or via a communication interface KS2 to a further central database FPDB in which timetables and/or schedules and/or vehicle deployment plans of all the rail vehicles of the fleet SFF are stored and in which these plans are changed or adapted if necessary. Such changes to existing plans are also referred to as scheduling. Information relating to the timetables fp or schedules as well as, if applicable, performed scheduling disp are made available to the charging planning facility LPE by the further central database FPDB via a suitable communication interface. This information is transmitted, for example, at regular intervals and can comprise, for example, complete plans and schedules or only changes to previously communicated versions of the plans. If appropriate or necessary, the information provided by the further central database FPDB can be stored in the central database LIDB by the charging planning facility LPE, if necessary after prior processing by the charging planning facility LPE, so that the information can be accessed directly. The further central database FPDB for storing and managing plans can also be configured in accordance with the central database LIDB as a separate structural unit, but it is preferably also configured as part of a central data memory, in particular a cloud data memory or cloud data storage system.

From the rail vehicles of the first number of rail vehicles SFB1, static and temporally variable information is transmitted at regular intervals, for example, via the radio interface FS to the charging planning facility LPE or the arrangement LSA. This information contains, for example, a vehicle-specific identification id, by means of which a direct link to the current timetable or schedule applicable to this rail vehicle SFB1 can be established in the charging planning facility LPE. Furthermore, the transmitted information comprises, for example, a current position pos of the rail vehicle SFB1 on the route traveled, a current speed vc, a current state of charge bs of the energy storage system or energy storage systems ES of the rail vehicle SFB1 and, if available, the power consumption pd expected in the future. The latter information relating to the expected power or energy requirement pd can originate, for example, from the controller ST, which makes an estimate of the amount of energy required for this on the basis of its own knowledge of the route sections still to be traversed and on the timetable to be adhered to. The information received from the first number of rail vehicles SFB1 is stored in the central database LIDB for further processing by the charging planning facility LPE.

Based on the information of the first number of rail vehicles combined in the central database LIDB and of the further central database FPDB, the charging planning facility LPE determines a vehicle-specific charging plan cp for each of the first number of rail vehicles SFB1, which is transmitted by the charging planning facility LPE or the arrangement LSA with supplementary indication of the identification id1 of the rail vehicle SFB1 via the radio interface FS. The charging plan cp defines, for example, a time for the start of a next charging process as well as a duration of the charging process dependent on the amount of energy to be charged and/or the power consumption during the charging process. In addition, the charging plan cp can also comprise future times for the respective start of a charging process, its duration and/or power consumption. Alternatively or additionally, the charging plan cp can also bring about, for example, a reduction or limitation of the power consumption in a charging process of a rail vehicle SFB1 which has already been started. This can be done, for example, by means of a threshold value sw determined by the charging planning facility LPE, which indicates, as a component of the charging plan cp, a maximum permitted power consumption by the rail vehicle SFB1 during the charging process. A corresponding limitation of the power consumption by means of a specific threshold value can also take place in addition, for example while the rail vehicle SFB1 is traveling on an electrified section of the rail network. In this case, the difference between the absorbable power and the required power is taken from the energy storage system ES of the rail vehicle SFB1.

The charging planning facility LPE determines the charging plan cp of the rail vehicle SFB1, taking into account the power consumption of the fleet, in particular with the aim of keeping the power consumption of the fleet averaged over a specific period of time below a predetermined threshold value. This predetermined threshold value corresponds, for example, to a specific amount or a specific increase in the amount of a service price to be reimbursed according to the billing model of the network operator. By means of the combined information, the charging planning facility LPE can determine the respective times, periods of time and power consumption during the charging of the rail vehicles SFB1 in order, for example, to bring about a temporary reduction in periods of high-power consumption using the electrical energy stored in the energy storage systems. A period of high power consumption can be, for example, a parallel start-up of a plurality of rail vehicles after a stop at a respective holding station. During this period, a time shift of a charging process of another rail vehicle can be brought about by means of the charging plan cp until the power consumption of the fleet SFF is lower again. Accordingly, a threshold value sw can also cause the power consumption of one or more other rail vehicles to be temporarily reduced.

For the determination of the charging plans cp and, if applicable, of threshold values sw, the charging planning facility LPE uses an algorithm which, on the one hand, is optimized with regard to power consumption of the fleet SFF, but on the other hand ensures that the energy storage systems ES are charged in such a way that the rail vehicles can be used in accordance with their predefined timetables or schedules. In addition to the current information, this algorithm preferably also takes into account historical data and findings and is designed as a learning algorithm. In particular, due to the predominantly fixed structure of the timetables or schedules, historical data can advantageously be used by such an algorithm as certain driving situations and charging situations occur with a high probability of recurrence and can be treated accordingly with regard to the desired optimization.

In addition to taking into account information of the rail vehicles SFB1 of the first number of rail vehicles currently already in driving mode for the determination of the charging plans cp, it is also advantageously possible to take into account information of rail vehicles SFB2 of the second number of rail vehicles of the fleet SFF which are not in driving mode or can only be moved into driving mode in the future. For this purpose, a vehicle-specific identification id2 and a current state of charge bs of the energy storage system ES are again transmitted from these rail vehicles SFB2, as shown in the FIGURE, for example, to the charging planning facility LPE. Based on this information, the respectively assigned timetable, schedule or vehicle deployment plan as well as the further information, the charging planning facility LPE determines a charging plan cp for the rail vehicle SFB2 and accordingly also takes into account the supplementary information of the second number of rail vehicles for the determination of the charging plans cp of the first number of rail vehicles.

Likewise, when determining the charging plans cp and, if appropriate, threshold values sw for the power consumption, the charging planning facility LPE preferably also takes into account information from rail vehicles SFC of the third number of rail vehicles. These rail vehicles, which are currently in driving mode and without energy storage systems, transmit, for example in addition to vehicle-specific identification id3, information relating to a current position pos and speed vc as well as, if available, a future power consumption pd determined by the controller ST of the rail vehicle SFC.

The invention claimed is:

1. A method for controlling electrical power consumption of a rail vehicle fleet, the rail vehicle fleet having a plurality of rail vehicles, each having at least one electrical energy storage system for supplying a drive system of a rail vehicle with electrical energy, and energy storage systems of the rail vehicles being charged by means of an electrical supply network and/or electric charging stations disposed along a rail network traversed by the rail vehicle fleet, which comprises the steps of:

combining, in a central database at least:

static and time-varying information regarding the rail vehicles of the plurality of rail vehicles currently in a driving mode; and static information relating to a respective timetable and/or schedule and/or vehicle deployment plan of currently operating ones of the rail vehicles, resulting in combined information;

determining, by means of the combined information and taking into account a power consumption of the rail vehicle fleet from a charging planning facility, a vehicle-specific charging plan for charging the energy storage systems of the rail vehicles currently in the driving mode; and carrying out a charging of the energy storage systems of the rail vehicles currently in the driving mode in dependence on the vehicle-specific charging plan.

2. The method according to claim 1, which further comprises:

additionally combining in the central database:

static and time-varying information of further rail vehicles of the plurality of rail vehicles which are going to be operated in a future; and static information relating to the respective timetable and/or schedule and/or vehicle deployment plan of the further rail vehicles;

additionally taking into account the static and time-varying information of the further rail vehicles from the charging planning facility for a determination of the vehicle-specific charging plan for charging the energy storage systems of the rail vehicles currently in the driving mode;

additionally determining, by means of the combined information from the charging planning facility, the vehicle-specific charging plan for charging the energy storage systems of the further rail vehicles, taking into account the power consumption of the rail vehicle fleet; and carrying out a charging of the energy storage systems of the further rail vehicle in dependence on the vehicle-specific charging plan.

3. The method according to claim 2, which further comprises:

further combining in the central database:

static and time-varying information from other rail vehicles of the rail vehicle fleet in the driving mode and without said electrical energy storage systems, wherein the drive system of a respective one of the other rail vehicles is supplied with the electrical energy by means of the supply network; and static information relating to the respective timetable and/or schedule and/or vehicle deployment plan of the other rail vehicles;

additionally taking into account the static and time-varying information of the other rail vehicles from the charging planning facility for determining the vehicle-specific charging plan for charging the energy storage systems of the rail vehicles currently in the driving mode.

4. The method according to claim 3, wherein the rail vehicles of the rail vehicle fleet and the central database and/or the charging planning facility each have a communication interface, the method further comprises:

transmitting the static and time-varying information of the rail vehicles to the central database via the communication interfaces; and transmitting vehicle-specific charging plans or respective information relating to the vehicle-specific charging plans to the rail vehicles.

5. The method according to claim 3, which further comprises additionally taking into account the static and time-varying information of the further rail vehicles moving into the driving mode in the future from the charging planning facility for determining the vehicle-specific charging plan for charging the energy storage systems of the rail vehicles currently in the driving mode.

6. The method according to claim 3, wherein:

the central database and a central timetable and schedule database each have a communication interface to the charging planning facility; and the static and time-varying information relating to the respective timetable and/or schedule and/or vehicle deployment plan of the currently operated rail vehicles and of the further rail vehicles moving into the driving mode in the future and/or of the other rail vehicles of the rail vehicle fleet is transmitted via the communication interfaces.

7. The method according to claim 2, wherein:

the vehicle-specific charging plan additionally determines a vehicle-specific threshold value for the power consumption of the rail vehicles currently in the driving mode; and the power consumption of the rail vehicles currently in the driving mode is controlled in dependence on the vehicle-specific threshold value.

8. The method according to claim 7, wherein:

the vehicle-specific charging plan additionally determines the vehicle-specific threshold value for the power consumption of the further rail vehicles moving into the driving mode in the future; and the power consumption of the rail vehicles and of the further rail vehicles moving into the driving mode in the future, is controlled in dependence on the vehicle-specific threshold value.

9. The method according to claim 2, wherein the information regarding the further rail vehicles moving into the driving mode in the future, contains:

at least one piece of information as the static information being selected from the group consisting of: an identification and a vehicle type;

at least one piece of information as the time-varying information being selected from the group consisting of:

a current position;

a current speed;

a current and/or expected power consumption;

current and/or historical energy consumption values; and a current state of charge of the at least one energy storage system.

10. The method according to claim 1, which further comprises combining, in the central database, in addition, time-varying information relating to the respective timetable and/or schedule and/or vehicle deployment plan of the rail vehicles.

11. The method according to claim 1, which further comprises:

additionally determining the vehicle-specific charging plan for a discharging of the energy storage systems of the rail vehicles currently in the driving mode; and carrying out the discharging of the energy storage systems of the rail vehicles currently in the driving mode in dependence on the vehicle-specific charging plan.

12. The method according to claim 1, wherein information regarding the rail vehicles currently in the driving mode, contains:

as the static information, at least one piece of information is selected from the group consisting of: an identification and a vehicle type;

as the time-varying information, at least one piece of information is selected from the group consisting of:

a current position;

a current speed;

a current and/or expected power consumption;

current and/or historical energy consumption values; and a current state of charge of the at least one energy storage system.

13. The method according to claim 1, wherein:

the central database and a central timetable and schedule database each have a communication interface to the charging planning facility; and the static information relating to the respective timetable and/or schedule and/or vehicle deployment plan of currently operated rail vehicles is transmitted via the communication interfaces.

14. A configuration for controlling electrical power consumption of a rail vehicle fleet, the configuration comprising:

at least one central database; and a charging planning facility, wherein at least a plurality of rail vehicles of the rail vehicle fleet is connected in terms of communication technology to said at least central database and/or to said charging planning facility, wherein the rail vehicles each have at least one electrical energy storage system for supplying a drive system with electrical energy, which can be charged by means of an electrical supply network and/or electric charging stations along a rail network traversed by the rail vehicle fleet, and wherein the configuration is configured to carry out a method according to claim 1.

15. A rail vehicle of a rail vehicle fleet, the rail vehicle comprising:

a drive system;

at least one electrical energy storage system, said at least one energy storage system serving to supply said drive system with electrical energy;

a communication interface for transmitting static and time-varying information to a configuration assigned to the rail vehicle fleet, the configuration containing at least one central database and a charging planning facility, and for receiving a charging plan, wherein the charging plan from the charging planning facility is determined by means of information combined in the central database and of static and time-varying information of further rail vehicles of the rail vehicle fleet currently in a driving mode, static information relating to a timetable and/or schedule and/or vehicle deployment plan of the rail vehicle and taking into account a power consumption of the rail vehicle fleet; and a rail vehicle controller for controlling the charging of said at least one energy storage system in dependence on the charging plan.

* * * * *